P. BORSZCZ.
ANIMAL TRAP.
APPLICATION FILED OCT. 16, 1917.
1,261,899.
Patented Apr. 9, 1918.
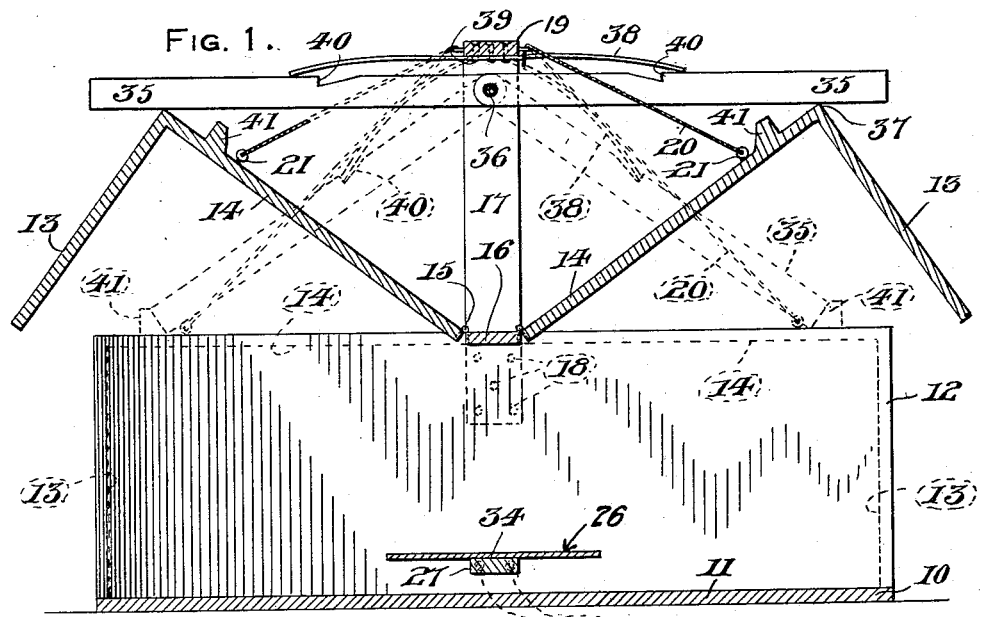
Inventor
P. Borszcz
By N. M. Wilson
Attorney

UNITED STATES PATENT OFFICE.

PETER BORSZCZ, OF CHICAGO, ILLINOIS.

ANIMAL-TRAP.

1,261,899.   Specification of Letters Patent.   Patented Apr. 9, 1918.

Application filed October 16, 1917. Serial No. 196,909.

*To all whom it may concern:*

Be it known that I, PETER BORSZCZ, a subject of the Emperor of Austria, residing at Chicago, in the county of Cook and State of Illinois, have invented certain new and useful Improvements in Animal-Traps, of which the following is a specification.

The primary object of my invention is the provision of a trap for catching different kinds of animals, according to the size of the trap, the construction being such as to retain the animals alive, with the device in its locked position surrounding the animals.

A further object of the invention is the provision of a trap of the box type that is readily sprung by an animal entering the same, a combined closing and locking means being provided therefor.

A still further object of the invention is the provision of a trap that is easy and inexpensive to manufacture but which possesses great strength and is capable of catching and retaining animals alive and uninjured until released by the owner of the trap.

In the drawing forming a part of this application and in which like designating characters refer to corresponding parts throughout the several views, Figure 1 is a central vertical sectional view of the device with the elements illustrated by dotted lines in their operated closed arrangement.

Fig. 2 is a top plan view thereof partially broken away.

Fig. 3 is an end elevation of the same.

Fig. 4 is a perspective view of the trip member, and

Fig. 5 is a similar view of the connecting block employed.

It will be understood that the device may be made of any desired size for catching different sized animals, and the same broadly consists of a box 10 having a bottom 11 and opposite side walls 12 while the end walls 13 thereof are secured to the adjacent top sections 14 which together form opposite end doors for the trap, it being noted that the top sections 14 are hinged at their inner ends as at 15 to a central transverse top cleat 16 connecting the side walls 12 together. A U-shaped frame or arch 17 overlies the box 10 being attached to the sides 12 as at 18 and having a top cross-piece 19 arranged parallel with the cleat 16, cords 20 are attached to the doors at 21 being passed through eyes 22 in the cross-piece 19 and thence through eyes 23 at the adjacent upper corner of the frame 17 and passing downwardly are secured to an eye 24 upon a setting-prop 25.

A trip member 26 is provided and comprises a bar 27 having one end connected by coil springs 28 with the inner face of one of the side walls 12, the bar passing through a slot 29 in the opposite side wall of the box and being provided with an upwardly and inwardly turned finger 30 adapted to receive a lug 31 formed upon one end of the prop 25, the opposite end 32 of the prop being received beneath the lower end of the adjacent side 33 of the frame 17. A platform 34 is arranged upon the bar 27 adapted for the reception of suitable bait for attracting animals into the box 10.

Arms 35 are pivoted upon a rod 36 carried by the frame 17 beneath the cross-piece 19 and are resiliently engaged with the edges 37 of the doors when the doors are elevated, by means of a spring 38 secured as at 39 centrally beneath cross-piece 19 and bearing upon the upper edges of the arms 35. When an animal enters the box 10 and presses downwardly upon the platform 34, the prop 25 is released, permitting the doors to be closed downwardly by the action of the spring 38 upon the arms 35. When the doors are in their closed positions, the free ends of the spring 38 will seat within notches 40 in the upper edges of the arms 35 with the free ends of the arms engaging behind shoulders 41 upon the top sections 14. This position of the arms 35 retains the doors in their closed position imprisoning the animal within the trap, 38. Upon releasing the spring, one or both of the arms 35 may be elevated for permitting the opening of the doors and when both are so elevated, the prop 25 may be readily positioned beneath the side 33 of the frame 17 with its lug 31 engaging the trip 26 and maintaining the trap in its set arrangement until again tripped by an animal. It will be seen that both of the doors will be elevated and lowered simultaneously during the operation of the device and that a trap of great strength is provided, the parts of which are not liable to get out of order.

What I claim as new is:—

A trap comprising a box having hinged top sections, ends for the box secured to said top sections forming opposite doors, shoulders upon the upper sides of the top sections, a trip arranged within the box, operative connections between the said doors and trip, an arch overlying the box, oppositely extending arms pivoted to said arch in contact with said doors adapted for engaging the shoulders thereof when the doors are closed, the said arms having notches in their upper edges and an operating spring carried by said arch with its ends engaging the said arms and adapted for seating within the notches thereof when the doors are closed.

In testimony whereof I affix my signature.

PETER BORSZCZ.